United States Patent [19]

Neumann

[11] 4,049,780
[45] Sept. 20, 1977

[54] PRODUCTION OF MAGNESIUM SILICATES

[75] Inventor: Barbara Susan Neumann, Redhill, England

[73] Assignee: Laporte Industries Limited, London, England

[21] Appl. No.: 687,499

[22] Filed: May 18, 1976

Related U.S. Application Data

[63] Continuation-in-part of Ser. No. 415,701, Nov. 14, 1973, abandoned.

[30] Foreign Application Priority Data

Nov. 14, 1972 United Kingdom ............... 52416/72

[51] Int. Cl.$^2$ ..................... C01B 33/22; C01B 33/24; C01B 33/32
[52] U.S. Cl. .................................... 423/331; 106/71; 423/326; 423/332
[58] Field of Search .................. 106/71; 423/155, 158, 423/326, 331, 332, 333

[56] References Cited

U.S. PATENT DOCUMENTS

| | | | |
|---|---|---|---|
| 1,999,210 | 8/1935 | Rembert | 423/331 |
| 3,586,478 | 6/1971 | Neumann | 423/331 |
| 3,666,407 | 5/1972 | Orlemann | 423/331 |
| 3,671,190 | 6/1972 | Neumann | 423/331 |
| 3,954,943 | 5/1976 | Neumann | 423/326 |

FOREIGN PATENT DOCUMENTS

| | | | |
|---|---|---|---|
| 666,992 | 7/1963 | Canada | 423/331 |
| 1,121,501 | 7/1968 | United Kingdom | 423/331 |
| 602,453 | 5/1948 | United Kingdom | 423/331 |
| 1,213,122 | 11/1970 | United Kingdom | 423/331 |
| 1,054,111 | 1/1967 | United Kingdom | 423/331 |
| 1,155,595 | 6/1969 | United Kingdom | 423/331 |

OTHER PUBLICATIONS

Grandquist et al. "Clay and Clay Minerals" Proceeding of the Eighth National Conference on Clays & Clay Minerals, 1960 pp. 150–169.

Primary Examiner—O. R. Vertiz
Assistant Examiner—Gary R. Straub
Attorney, Agent, or Firm—Beveridge, DeGrandi, Kline & Lunsford

[57] ABSTRACT

Hydrous magnesium silicates having a crystal structure similar to that of natural hectorite may be produced by a precipitation process in which silica is precipitated into a preformed aqueous suspension of a water insoluble magnesium compound. The process may be operated at high concentration and the products may have good dispersibility in aqueous media and high optical clarity when dispersed as well as the good rheological properties which may be obtained by prior precipitation processes.

10 Claims, No Drawings

PRODUCTION OF MAGNESIUM SILICATES

REFERENCE TO A RELATED APPLICATION

This application is a continuation-in-part of my co-pending application Ser. No. 415,701 filed Nov. 14, 1973, now abandoned which is relied on herein.

INTRODUCTION AND BACKGROUND

This invention relates to a process for the synthesis of hydrous magnesium silicates.

The name "hectorite" has been ascribed to a natural trioctahedral smectite found at Hector, Calif., U.S.A. This clay is a hydrous magnesium silicate having the ideal composition $Si_8Mg_6O_{20}(OH)_4$ modified by having a portion of the $Mg^{+2}$ and $OH^-$ ions replaced by $Li^+$ and $F^-$ ions. The synthesis of hydrous magnesium silicates similar to natural hectorite has been described by Granquist and Pollack in "Clays and Clay Minerals" Volume 8 (Proceedings of the 8th National Conference on Clays and Clay Minerals) Pages 150-169. In the process described by Granquist gels of magnesium hydroxide and of silica are produced separately, are washed, are combined and are redispersed in water to form a suspension. Lithium hydroxide or lithium fluoride and sodium hydroxide are added to the suspension which is then treated hydrothermally by refluxing it with stirring until a product having a crystal structure similar to that of hectorite is formed.

While Granquist's product has a crystal structure similar to natural hectorite it does not have good rheological properties. A standard yardstick of rheological properties of a substance is provided by measuring the Bingham Yield Value of an aqueous dispersion of the substance. The term Bingham Yield Value (also known as Bingham Yield Stress, these terms being alternatives for the same property) is referred to in standard works on rheology for example in "Rheology Theory and Applications" F. R. Eirich (Acad. Press) Volume 1 (1956) page 658 and "Colloidal Dispersions" L. K. Fischer (N.Y. Bureau of Standards) 2nd Edition 1953 Pages 150-170 and "The Chemistry and Physics of Clays and other Ceramic Materials" 3rd Edition Page 463, A. B. Searle and R. W. Grimshaw.

The Bingham Yield Value may be determined by first obtaining a flow curve relating the shear stress to the rate of shear and then extrapolating the straight line section of the curve to the shear stress axis the intercept being the Bingham Yield Value. It can conveniently be determined on any viscometer capable of measuring a range of shear rates and shear stresses.

The product of Granquist, i.e. as a dispersion obtained using 2 g silicate and 100 ml tap water, gives a Bingham Yield Value of only about 15 dynes per $cm^2$. This is a very low value, inferior to that given by natural hectorite. It also gives a low static gel strength.

Processes for the production of synthetic hydrous magnesium silicates having a crystal structure similar to natural hectorite but having better rheological properties than natural hectorite have been described in British Pat. Nos. 1,054,111 and 1,213,122. These processes describe the production of synthetic hydrous magnesium silicates having a characteristic hectorite-like structure and having varying contents of lithium and fluorine, by a process essentially involving direct coprecipitation of magnesium silicate.

The process described in British Pat. No. 1,054,111 involves forming a slurry by co-precipitation by slowly combining with heating and agitation in an aqueous medium a constituent providing the magnesium ions with constituents providing the silicon (as silicte) hydroxyl and sodium ions and treating the precipitate hydrothermally. The concentration of the slurry is desirably such that the concentration of the product formed is from 1 to 8% by weight, preferably 4% by weight. The hydrous magnesium silicate contains fluorine and lithium.

The process described in British Pat. No. 1,213,122 involves precipitating a magnesium silicate by combining an aqueous solution of a water soluble magnesium salt with an aqueous alkaline solution of one or more sodium compounds in the presence of dissolved silicon compound and hydrothermally treating the precipitate under pressure. The concentration of the precipitate is preferably not more than 5% by weight. The hydrous magnesium silicate product contains no fluorine and optionally contains lithium.

The products of the processes of the two British patents are also characterized by providing dispersions giving exceedingly high Bingham Yield Values in excess of any known to be given by natural hectorite dispersions and usually above 40 for example from about 50 to 250, dynes per $cm^2$ as a 2% dispersion in tap water, and high static gel strength. Such products have found widespread use by reason of their excellent rheological properties.

The above described coprecipitation processes are subject to certain difficulties of operation. If operated using a relatively high excess of alkali over that required for the reaction on a stoichiometric basis viscosity problems may cause difficulties in mixing the reactants and this may result in a lowering of the yield.

Operation of these processes at a relatively high concentration may cause filtering and washing difficulties and operation at low concentration results in the necessity to handle large quantities of liquid. This results in higher heating costs and higher equipment costs, particularly in relation to the hydrothermal treatment stage of the process.

It may be difficult, regardless of the concentration and excess of alkali used to produce hydrated magnesium silicates which disperse readily in cold water to give absolutely clear dispersion. Such properties can assume importance if the hydrated magnesium silicate is for use in for example the toiletries industry where the appearance of products containing such silicate is important.

SUMMARY OF THE INVENTION

The present invention relates to a new or improved process for the synthesis of hydrous magnesium silicates having a crystal structure similar to that of natural hectorite.

The present invention provides a process for the synthesis of a hydrous magnesium silicate having a crystal structure similar to that of a natural hectorite by precipitating a water insoluble magnesium compound and silica in an aqueous medium and maintaining the precipitate in the wet state and treating it hydrothermally in the presence of excess sodium or lithium compound over that required to form the cation of the hydrous magnesium silicate, and recovering the resulting crystalline hydrous magnesium silicate, in which the improvement comprises combining the water insoluble magnesium compound and silica by precipitating the silica into a preformed aqueous suspension of the water insoluble magnesium compound.

The present invention is to be distinguished from the processes described in British Pat. Nos. 1,054,111 and 1,213,122 in that, in those processes, the magnesium compound and the silica are coprecipitated. Clearly the benefits of the present invention may be obtained at least partly by including only a part of the magnesium compound in the preformed suspension and therefore the invention is not strictly limited to the whole of the magnesium compound being in the preformed suspension. As the proportion of magnesium compound included by known means, for example coprecipitation, increases, the deficiencies associated with that means also increase. Therefore preferably the majority of the magnesium, and particularly preferably all of the magnesium compound, is included in the preformed suspension.

According to another aspect the present invention further provides a process for the synthesis of a hydrous magnesium silicate having a crystal structure similar to that of hectorite and having the general formula

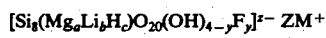

wherein $a$, $b$, $c$, $y$, $z$ and M have the values:
$a$ is $> 0$ to 6
$b$ is from 0 to $< 6$
$c$ is from 0 to $< 2$
$a+b+c$ is from $> 4$ to $< 8$
$y$ is from 0 to $< 4$
$z = 12-2a-b-c$
M is Na+ or Li+ comprising precipitating a water insoluble magnesium compound and silica, in proportions corresponding to the formula of the magnesium silicate, in an aqueous medium, maintaining the precipitate in the wet state and treating it hydrothermally by heating it in an aqueous medium and in the presence of the remaining constituents of the magnesium silicate and of excess dissolved sodium or lithium compound over that required to form the cation of the magnesium silicate until crystal growth occurs and separating the resulting crystalline material in which the improvement comprises the sequential process steps of forming an aqueous suspension containing a suitable water insoluble magnesium compound, and forming a silica precipitate in the aqueous suspension containing the magnesium compound.

In a preferred embodiment, the present invention provides a process for the synthesis of a hydrous magnesium silicate having an X-ray diffraction pattern indicative of a hectorite structure and having a Bingham Yield Value of from 40 to 250 dynes/cm² and having the general formula

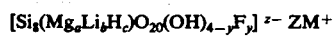

wherein $a$, $b$, $c$, $y$, $z$ and M have the values:
$a$ is 4.95 to 5.7
$b$ is from 0 to 1.05
$c$ is from 0 to 2
$a+b+c$ is from 4 to 8
$y$ is from 0 to 4
$z = 12-2a-b-c$
M is Na+ or Li+
comprising the steps of:

a. forming an aqueous suspension of magnesium carbonate by dissolving a suitable water soluble magnesium compound in water, precipitating magnesium carbonate by adding to the resulting solution an aqueous solution of sodium carbonate;

b. adding to a suspension of the freshly precipitated magnesium carbonate a water soluble silicon compound;

c. precipitating silica into the suspension of freshly precipitated magnesium carbonate by reacting the water soluble silicon compound with sodium carbonate;

the total time for addition in step (a) and in step (b) being at least 30 minutes; and probably over a time of from 30 minutes to 4 hours;

d. adding during or after step (a) or (b) or (c) lithium or fluorine ions if required by the general formula above;

e. controlling the quantity of magnesium carbonate and silicon precipitated and the quantity of lithium or fluorine ions added to give Si:Mg:Li:F ratio within the range stated in the general formula above;

f. controlling the concentrations of the reactants used in steps (a), (b) and (e) to give a suspension having a concentration of solids at least 5% by weight;

g. maintaining the solids in the wet state;

h. treating the wet solids as a suspension having a concentration of at least 5% by weight in water in the presence of an excess of sodium or lithium ions of from 25 to 250% over that providing the cation M in the general formula above by heating it to cause crystal growth of the hydrous magnesium silicate of the above formula for from 1 to 20 hours at a pressure at least equal to atmospheric pressure while maintaining the presence of water in the liquid state; and thereafter i. separating the resulting crystalline hydrous magnesium silicate.

The suspension of magnesium compound may be formed by adding a finely divided powder of the magnesium compound directly to water, or preferably, by dissolving a suitable water soluble magnesium compound, for example, magnesium sulphate, and adding it to an aqueous solution of one or more sodium or lithium compounds, preferably sodium carbonate, to precipitate it. Preferably the quantity of sodium or lithium compound including any present in the reactants is not more than required in theory to precipitate the magnesium compound and any other constituent of the hydrous magnesium silicate present.

A silica precipitate may be formed by combining a suitable silicon compound, for example, syrupy sodium silicate solution having 29% SiO₂ and 8.8% Na₂O, with one or more sodium compounds. If the suspension containing magnesium compound has been made by precipitation from a solution of a magnesium salt by an aqueous siolution of one or more sodium compounds and if a sufficient excess of sodium compound has been used, the silica may be precipitated by adding a solution of the suitable silicon compound directly into the suspension. Alternatively, if an insufficient amount of sodium compound has been used to precipitate the magnesium compound and also the silica, further sodium compound may be added to the suspension of the magnesium compound and a solution of the suitable silicon compound then added. Alternatively the silicon compound may be used as an aqueous solution containing insufficient sodium compound to precipitate it which may be added to the suspension containing magnesium compound and sufficient sodium compound to cause precipitation of the silica. Any alternative method which results in precipitation of silica in the suspension of preformed insoluble magnesium compound may be used.

Preferably the lithium and fluoride components of the synthetic magnesium silicate are incorporated in the aqueous suspension of magnesium compound, e.g., by dissolving lithium and fluoride compounds in the suspension before precipitation of the silica. Alternatively, suitable lithium and/or fluorine compounds may be introduced after precipitation of the silica. Examples of suitable compounds are lithium carbonate, sodium silico-fluoride, hydrofluoric acid, lithium fluoride, and lithium sulphate.

The resulting precipitate containing the components of the desired hydrous magnesium silicate must be maintained in the wet state until after the hydrothermal treatment. Preferably the entire aqueous suspension in which the precipitate is formed is subjected to hydrothermal treatment.

Hydrothermal treatment may be conducted by heating in the presence of a liquid phase for from about 1 to 20 hours to crystallize the synthetic silicate. The degree of hydrothermal treatment required may vary considerably. At one end of the scale a mere boiling with agitation for, for example, up to about 6 hours may be conducted. Such a treatment tends to be suitable when the hydrous magnesium silicate has a relatively high fluorine content. At the other end of the scale it may be necessary to heat under pressure, for example at a temperature of at least 170° C and at a pressure of at least 100 psi, while still maintaining the presence of the liquid phase, to obtain suitable crystal growth. Such a hydrothermal treatment may suitably be applied to the production of hydrous magnesium silicates having a low fluorine content.

The aqueous suspension subjected to hydrothermal treatment preferably contains excess dissolved sodium or lithium compounds, as the carbonate or hydroxide, or silicate, over that required to provide the cation of the hydrous magnesium silicate. The amount of the excess which is desirable for the formation of a hydrous magnesium silicate having good rheological properties will vary according to the particular magnesium silicate desired. It is not possible, therefore, to specify a lower limit of excess dissolved sodium or lithium compound but the amount of excess necessary for success may be optimized by simple experimental tests after the particular magnesium silicate has been selected.

Preferably the excess of sodium or lithium compound is at least 25 to 250% and most preferably from 50 to 250%, for example, 100 to 200% on the basis defined above.

The crystalline material resulting from the hydrothermal treatment is separated by filtration, is suitably washed, and is dried at a temperature not substantially exceeding 450° C.

The present invention may be operated to give a relatively high concentration of precipitate in the aqueous medium without serious viscosity problems arising, despite use of a large excess of sodium or lithium ions during precipitation. Preferably the process is operated to give a precipitate equal to at least 5%, for example, from 5 to 10%, by weight of the precipitate and aqueous medium.

This represents a considerable increase in the productivity of the hydrothermal treatment apparatus in comparison with the previously used concentration of precipitate of about 4% by weight of the precipitate and aqueous medium.

At concentrations of about 7% and above, viscosity problems may be encountered in the manufacture of hydrous magnesium silicates containing appreciable quantities of lithium, for example about 1 atom of lithium per 8 atoms of silicon. Preferably therefore, at high concentrations, relatively little, or no, lithium compounds are present during precipitation. Preferably at high concentrations the quantity of lithium is not more than 0.5 atoms, for example, from 0.1 to 0.5 atoms, per 8 atoms of silicon during precipitation.

The present invention also makes possible the production of hydrous magnesium silicates having a crystal structure similar to that of natural hectorites and giving extremely fast dispersion in cold or hot aqueous media without sacrificing the excellent rheological properties characteristic of the processes of British Pat. Nos. 1,054,111 and 1,213,122. As a general rule good dispersibility goes hand in hand with optical clarity in the resulting dispersion.

The most desirable properties are normally found in products prepared using sodium carbonate to form a magnesium carbonate suspension.

To ensure a product having good dispersibility the process should preferably be controlled carefully along the following lines.

The precipitation of the water insoluble magnesium compound should preferably be conducted over an extended period of time, for example, over a period of from 30 minutes to 3 hours and preferably of from 1 to 2 hours. The precipitate of magnesium compound tends to be somewhat unstable and liable to become less suitable for the practice of the invention if subjected to extreme conditions. For example, the precipitate should not be boiled. The precipitation should also be conducted by introducing a suitable sodium compound into a solution of a magnesium salt and not the reverse.

The silica precipitate should be preferably formed gently, that is to say, gentle physical precipitation conditions should be used. Any precipitation conditions resulting in the formation of a large number of small seed crystals tend to reduce the quality of the product in this respect. Generally, fast addition of the dissolved silicon compound to the suspension is to be avoided as is fast stirring during precipitation. In view of the variation in scale which may be used in carrying out the process of this invention it is not possible to define the term "gently" in absolute terms. For guidance, the silicon compound may suitably be added over a period of at least 15 minutes preferably over a period of from 15 minutes to 1 hour.

As will be seen from the foregoing and from the examples, the total precipitation time for precipitation of the magnesium compound and the precipitation of the silica will be in the range of 30 minutes to 4 hours.

Stirring rates will tend to be determined by the process scale but should, if possible, be kept below about 1000 rpm. preferably below about 200 rpm.

Boiling after precipitation but before pressure hydrothermal treatment, if used, may also assist in improving the optical properties of the product although it is not always necessary.

In the production of a particular hydrous magnesium silicate, it may be possible to obtain a good product without maintaining all of the above process limitations at their optimum value and reference is made to Example 4 where a hydrous magnesium silicate product having good optical properties was obtained, even though the silicon delivering material was added to the suspension quickly, using hand stirring at a speed of below 100 rpm.

The present invention also makes possible the production of hydrous magnesium silicates having a crystal structure similar to that of natural hectorite, having a high Bingham Yield Value, having excellent dispersion and optical properties, if the process has been suitably controlled and also having a low cation exchange capacity.

The products of British Pat. Nos. 1,054,111 and 1,213,122 gave a high Bingham Yield Value but also had a cation exchange capacity of above 50 m. eq. per 100 grams. For certain applications, a combination of good rheological properties and a low cation exchange capacity is advantageous. An example of such an application is found in the field of paint manufacture. In this case, of course, the optical properties of the clay are not important. According to a further feature the present invention therefore also provides synthetic hydrous magnesium silicates having a crystal structure similar to that of natural hectorite and having the general formula

$[Si_8(Mg_aLi_bH_c)O_{20}(OH)_{4-y}F_y]^{z-} ZM^+$ where $a$, $b$, $c$, $y$, $z$ and M have the values hereinbefore ascribed to them, and having a Bingham Yield Value, as a 2% dispersion, in water having a hardness of approximately 140 mg. per l. calcium carbonate, of from about 50 to 250 dynes per cm$^2$, and having a cation exchange capacity of from about 25 to 50 m. eq. per 100 grams, and optionally, giving a cold dispersibility as hereinafter defined of less than 1.0.

The production of material having a cation exchange capacity within the above range is encouraged by controlling the quantity of sodium compound present when the water insoluble magnesium compound is precipitated, preferably to slightly below the stoichiometric quantity for the precipitation of the magnesium and any lithium or fluorine present and by controlling the hydrothermal treatment to a relatively short duration, for example, not more than 2 hours, and a relatively low temperature, for example, not more than 150° C preferably not more than 100° C.

DETAILED DESCRIPTION OF INVENTION

In order that the invention may be understood more readily it is illustrated by means of the following examples. Examples 2 to 29 are according to the invention. Example 1 is inserted for comparative purposes. In the Examples the following tests are used.

Optical Density.

The sample is added in 2% concentration by weight to distilled water, or aqueous solution as specified, at room temperature and the suspension brought to the boil and maintained boiling under reflux for 15 minutes with stirring. The suspension is cooled to room temperature and the optical density is measured using an EEL Absorbtiometer using a No. 603 filter and a 4 cm. cuvette.

Cold Dispersibility.

The sample is added to distilled water to give a concentration of 2% by weight at a temperature in the range of 17° to 23° C and the suspension is stirred for 15 minutes using a 3000 rpm stirrer. The optical density of the suspension is then measured immediately using the same apparatus as described above.

The range of optical densities of 0 to 0.60 so obtained is equivalent to a range of visual appearance from water clear to cloudy - translucent.

Static Gel Strength — Beam Balance.

Gel strength is measured using a boiled dispersion of 2% by weight concentration (on a wet weight basis) containing 0.4 me/g Na$_2$So$_4$. A simple beam balance as used in laboratories to weigh samples is modified by attaching a rigid extension to one arm of the beam. An aluminum disc is suspended in the horizontal plane by a stiff vertical wire from the extension. A beaker is placed on the balance pan on the same side of the balance as the extension and the beam is then balanced by placing weights on the other pan. The beam is suspended. A standard diameter container containing the sample to be measured is raised upwardly towards the aluminum disc until the surface of the sample contacts the aluminum disc, and the vertical position of the container is then adjusted to zero the balance pointer the disc being held on the surface of the sample by surface tension.

Water is introduced slowly into the beaker until its weight has caused the aluminum disc to sink into the sample sufficiently to cause a standard deflection of the balance pointer and the static gel strength is the volume of the water introduced into the beaker.

For reference the apparatus used to obtain the beam balance results quoted in this specification was so proportioned and the standard deflection was so selected, the water gave a Beam Balance reading of 12 and a gel which would just fail to flow from an upturned beaker would give a value of about 35.

EXAMPLES 1 and 2

The following separate solutions 1 to 4 were made up:
Solution
1 183.5g MgSO$_4$7H$_2$O, 10.1g LiSO$_4$.H$_2$O, 850g H$_2$O
2 250g Pyramid No1 sodium silicate (29% SiO$_2$, 8.8% Na$_2$O), 75.3g Na$_2$CO$_3$, 850g H$_2$O
3 75.3g Na$_2$CO$_3$, 600g H$_2$O
4 250g Pyramid No1 sodium silicate, 250g H$_2$O Thus solutions 3 and 4 together equal solution 2. In Example 1 solution 2 was added to solution 1 over 30 minutes thus precipitating Si and Mg values together according to the teaching of British Pat. No. 1,213,122. In Example 2, solution 3 was added to solution 1 followed by solution 4 thus firstly precipitating the Mg values and secondly the Si values. The total time of addition of solutions 3 and 4 was 30 minutes and during this time the mixture of solutions was stirred at 100 rpm in each instance. The ingredients used correspond to a ratio of Si:Mg:Li:Na of 8:4.95:1.05:14.1 and the amount of water gave a magnesium silicate concentration, during hydrothermal treatment, of approximately 5% w/w in each Example. The resulting slurries were boiled for 1 hour at atmospheric pressure and each was divided into two samples. The two samples for each Example were treated hydrothermally at 250psig for 3 and 6 hours respectively at 207° and the resulting hydrous magnesium silicate separated by filtration, washed and dried. The optical density of the product of each Example was measured.

Table I

| | OPTICAL DENSITY | | | |
| | Example 1 | | Example 2 | |
| Dispersion | Hours at 250psig | | | |
| | 3 | 6 | 3 | 6 |
| Dist. H$_2$O | 0.047 | 0.078 | 0.040 | 0.030 |
| Na$_2$SO$_4$ Soln. | 0.212 | 0.220 | 0.141 | 0.140 |

Table I-continued

| Dispersion | OPTICAL DENSITY | |
|---|---|---|
| | Example 1 | Example 2 |
| | Hours at 250psig | |
| 0.4 m eg Na+/g | | |

These results show that Example 2, which was according to the invention, gave a product of lower optical density than Example 1 which was not according to the invention using the same hydrothermal treatment. The optical density of the products of Example 2 decreased with increased duration of hydrothermal treatment whereas the opposite was true for Example 1. Each of the samples showed an X-ray diffraction pattern indicative of a crystal structure similar to that of natural hectorite and had good rheological properties.

EXAMPLES 3 - 9

The same procedure was used as in Example 2 the solutions used having compositions giving the overall atomic ratios Si:Mg:Li:Na = 8:5.3:0.1:24 and a concentration of precipitate of 5% by weight.

The suspension, containing precipitated silicate, at a 5% by weight concentration was hydrothermally treated for 3 hours at 250psig at 207° C. A number of Examples were conducted in which the following conditions were varied.
 a. Temperature of $MgSO_4 7H_2O$ solution (other solutions were at room temperature).
 b. Rate of addition of the sodium carbonate and sodium silicate solutions.
 c. Rate of stirring during addition of solutions 3 and 4.
 d. Boiling after addition and before hydrothermal treatment.

The optical density of the product of each example was measured as a 2% dispersion in distilled water after recovery, washing and drying. The process conditions varied and the optical density measurements obtained are summarized in Table II.

| Example | $MgSO_4 7H_2O$ Temperature of ° C. | Total time of addition of carbonate and silicate sols. | Rate of Stirring | Boiling Time (mins) | Optical Density |
|---|---|---|---|---|---|
| 3 | 20 | By pouring in at max. rate | 3000 rpm | 0 | not measured |
| 4 | 20 | " | hand stirred 100 rpm | 0 | 0.05 |
| 5 | 20 | Over 30 mins. addition time. | 3000 rpm | 0 | 0.10 |
| 6 | 20 | " | 100 rpm | 30 | not measured |
| 7 | 20 | " | " | 60 | 0.50 |
| 8 | 60 | " | 3000 rpm | 0 | not measured |
| 9 | 60 | " | 100 rpm | 30 | 0.03 |

Examples 3 - 7 show that a slow rate of addition of solutions 3 and 4, a slow rate of stirring, and boiling, all assist in the formation of a product having good optical properties. Where the optical density was not measured this was because the product had poor dispersion properties and, in fact, settled from the 2% dispersion formed for the purpose of optical density measurements. Examples 8 and 9 show that it is possible to obtain a product having really good optical properties using a warmed solution if the process features mentioned above are suitably controlled. All of the products had crystal structures similar to that of natural hectorite and good rheological properties. It will be apparent from the above table that the total time of addition of the carbonate and silicate solutions is at least 30 minutes.

EXAMPLES 10 - 14

The same procedure was used as in Example 9 with the sole modification, in Examples 11 - 14, that the quantity of water used in total was reduced to give the following weights of washed dried magnesium silicate per 100g slurry. The optical density, measured as a 2% dispersion in distilled water and the gel strength measured as a 2% dispersion in a solution of 0.8 me/g Na+ in distilled water is summarized in Table III together with the concentration used in each example.

TABLE III

| Example | g product/ 100 g slurry | Optical Density | Gel strength Beam balance |
|---|---|---|---|
| 10 | 5 | 0.06 | 93 |
| 11 | 6 | 0.09 | 45 |
| 12 | 7 | 0.015 | 55 |
| 13 | 8 | 0.005 | 78 |
| 14 | 9 | 0 | 62 |

In each of Examples 10 - 14 the hydrous magnesium silicate produced showed an X-ray diffraction pattern indicative of a crystal structure similar to natural hectorite.

A preparation was attempted using the overall atomic ratios in Example 10 and the coprecipitation method disclosed in British Pat. No. 1,213,122. A stiff gel phase formed in the sodium silicate/sodium carbonate solution making it impracticable to continue the preparation.

EXAMPLES 15 - 18

The same procedure was used as in Example 9, but the quantities of chemicals were adjusted to give different atomic ratios and the times under hydrothermal pressure were also varied.

The cation exchange capacities were measured by standard laboratory methods. The preparations were used to make 2% dispersions by boiling for 15 minutes in tap water of hardness 140 mg $CaCO_3$/liter and the Bingham Yield Values (BYV) were measured on a Fann Viscometer. The optical densities of the same dispersion, i.e., 2% in tap water having a hardness of 140 mg $CaCO_3$/liter, are also given. The process and results are summarized in the following table.

TABLE IV

| Ex. | Overall atomic ratio Si | Mg | Li | Hours at 250 p.s.i. | Cation exch. capacity (m.eg./100g.) | B.Y.V. (dyne/cm²) | Optical Density |
|---|---|---|---|---|---|---|---|
| 15 | 8 | 5.3 | 0.7 | 3 | 44 | 191 | 0.10 |
| 16 | 8 | 5.3 | 0.5 | 3 | 31 | 162 | 0.11 |
| 17 | 8 | 5.3 | 0.5 | 6 | 49 | 143 | 0.11 |
| 18 | 8 | 5.3 | 0   | 3 | 34 | 120 | 0.20 |

It is seen that these preparations combine low cation exchange capacity with high BYV and low optical density. In fact the optical density obtained in these examples compares well with that obtained in example 9 the apparent difference being attributable to the difference in the water used to make up the dispersion.

EXAMPLES 19 – 22

The same procedure was used as in Example 2 with the modifications that in Examples 20 and 22 $Na_2CO_3$ was replaced by an equivalent amount of NaOH and in Examples 21 and 22 the amount of $Na_2CO_3$ and NaOH was slightly greater being equal to the amount required in theory to precipitate the magnesium and lithium values in solution 1.

The gel strength of the products was measured by the Beam Balance method described above.

TABLE V

| Example No. | Solution 3 compound | % equiv. to Mg & Li in Solution 1 | Gel strength Beam Balance | Cold dispersibility | Optical Density |
|---|---|---|---|---|---|
| 19 | $Na_2CO_3$ | 94  | 46 | 0.245 | 0.08 |
| 20 | NaOH       | 94  | 45 | ∞     | ∞    |
| 21 | $Na_2CO_3$ | 100 | 48 | 0.60  | 0.06 |
| 22 | NaOH       | 100 | 50 | ∞     | 0.69 |

In Examples 19 and 20 a total of 14.1 and in Examples 21 and 22 a total of 15.6 atoms of Na were present per 8 atoms of Si.

EXAMPLES 23 – 27

In a consecutive series of experiments to the procedure used was that of Example 2 with the following modifications.

The solutions used contained an amount of $Na_2CO_3$ equivalent to 14.7 atoms of Na for every 8 atoms of Si.

The lithium content of solution 1 was reduced to half and was compensated for by an increase in the quantity of magnesium and the concentration of the solutions was adjusted to give a product concentration of 6% by weight after hydrothermal treatment. Solution 3 was added over 60 minutes and solution 4 over 15 minutes.

The products were isolated and examined and the results are summarized in Table VI.

TABLE VI

| Example No. | Cold Dispersibility | Optical Density | Gel strength Beam Balance |
|---|---|---|---|
| 23 | 0.26 | 0.15 | 52 |
| 24 | 0.29 | 0.11 | 50 |
| 25 | 0.28 | 0.13 | 48 |
| 26 | 0.30 | 0.16 | 42 |
| 27 | 0.33 | 0.18 | 54 |

By way of comparison the cold dispersibility of the product of consecutive series of preparations conducted using the procedure of Example 1 but on a larger scale and using a concentration of product after hydrothermal treatment of 4.1 % varied as follows
00, 00, 00, 0.82, 0.29, ∞ 0.95, 0.57, 0.57, 0.35

EXAMPLES 28 – 29

The following solutions were made up:
1. 1603.5 Kg $MgSO_4 7H_2O$, 37.1 Kg $Li_2SO_4 H_2O$, 4540 Kg $H_2O$
2. 671 Kg $Na_2CO_3$ 3589 Kg $H_2O$
3. 1910 Kg Pyramid No. 1 sodium silicate 2553 Kg $H_2O$ Solution 2 was added to solution 1 stirred at 100 rpm over a period of 2 hours, the temperature of the mixed solutions being maintained at 40° C approximately.

Solution 3 at a temperature of 20° C was added to the suspension resulting from mixing solutions 1 and 2 starting immediately after that mixing had been completed. The resulting suspension was boiled to expel $CO_2$ and was then autoclaved after heating up over a period of 2 hours for 6 hours at a pressure of 250 psig. The resulting product was washed and dried at a temperature of 150° C. The weight of dried precipitate corresponded to a 6% by weight concentration in the autoclave. The resulting material had a crystal structure similar to that of a natural hectorite. Its rheological properties were tested by the "Beam Balance" method and its Bingham Yield Value was also determined.

The example was also repeated using a smaller quantity of water so as to give a 9% concentration by weight in the autoclave and the product tested in the same manner.

The results are summarized as follows

| Example | Concentration | Bingham Yield Value | Gel Strength Beam Balance |
|---|---|---|---|
| 28 | 7% | 135 | 49 |
| 29 | 9% | 163 | 43 |

What I claim is:

1. A process for the synthesis of a hydrous magnesium silicate having an X-ray diffraction pattern indicative of a hectorite structure and having a Bingham Yield Value of from 40 to 250 dynes/cm² and having the general formula

$$[Si_a(Mg_aLi_bH_c)O_{20}(OH)_{4-y}F_y]^{z-}ZM^+$$

wherein $a$, $b$, $c$, $y$, $z$ and M have the values:
 $a$ is 4.95 to 5.7
 $b$ is from 0 to 1,05
 $c$ is from 0 to 2
 $a+b+c$ is from 4 to 8
 $y$ is from 0 to 4
 $z = 12-2a-b-c$
 M is Na+ or Li+
comprising the steps of:
 a. forming an aqueous suspension of magnesium carbionate by dissolving a suitable water soluble magnesium compound in water, precipitating magnesium carbonate by adding to the resulting solution an aqueous solution of sodium carbonate;

b. adding to a suspension of the freshly precipitated magnesium carbonate a water soluble silicon compound;

c. precipitating silica into the suspension of freshly precipitated magnesium carbonate by recting the water soluble silicon compound with sodium carbonate;

the total time for addition in step (a) and in step (b) being at least 30 minutes, d. adding during or after step (a) or (b) or (c) lithium or fluorine ions if required by the general formula above;

e. controlling the quantity of magnesium carbonate and silicon precipitated and the quantity of lithium or fluorine ions added to give a Si:Mg:Li:F ratio within the ranges stated in the general formula above;

f. controlling the concentrations of the reactants used in steps (a), (b) and (e) to give a suspension having a concentration of solids at least 5% by weight;

g. maintaining the solids in the wet state;

h. treating the wet solids as a suspension having a concentration of at least 5% by weight in water in the presence of an excess of sodium or lithium ions from 25 to 250% over that providing the cation M in the general formula above by heating it to cause crystal growth of the hydrous magnesium silicate of the above formula for from 1 to 20 hours at a pressure at least equal to atmospheric pressure while maintaining the presence of water in the liquid state; and i. separating the resulting crystalline hydrous magnesium silicate.

2. A process as claimed in claim 1 wherein the total time of addition in step (a) and in step (b) is from 30 minutes to 4 hours.

3. A process for the synthesis of a hydrous magnesium silicate having an X-ray diffraction pattern indicative of a hectorite structure having a Bingham Yield Value of from 40 to 250 dynes/cm² and having the general formula $$[Si_8(Mg_aLi_bH_c)O_{20}(OH)_{4-y}F_y]^{z-}ZM^+$$

wherein $a, b, c, y, z$ and $M$ have the values:
$a$ is 4.95 to 5.7
$b$ is from 0 to 1.05
$c$ is from 0 to $<2$
$a+b+c$ is from $>4$ to $<8$
$y$ is from 0 to $<4$
$Z = 12-2a-b-c$
M is Na+ 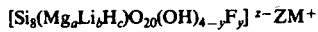 or Li+ comprising the steps of:

a. forming an aqueous suspension of magnesium carbonate by dissolving a suitable water soluble magnesium compound in water, precipitating magnesium carbonate by adding to the resulting solution sodium carbonate, said precipitation being conducted over a period of time of from 30 minutes to 3 hours, and suspending the freshly precipitated magnesium carbonate;

b. adding to the freshly precipitated magnesium carbonate a water soluble silicon compound;

c. precipitating silica into the suspension of freshly precipitated magnesium carbonate by reacting the water soluble silicon compound with sodium carbonate, the precipitation of silica being conducted over a period of time from 15 minutes to 1 hour;

d. adding during or after step (a) or (b) or (c) lithium or fluorine ions if required by the general formula above;

(e) controlling the quantity of magnesium carbonate and silica precipitated and the quantity of lithium or fluorine ions added to give a Si:Mg:Li:F ratio within the ranges stated in the general formula above;

f. controlling the concentrations of the reactants used in steps (a), (b) and (e) to give a suspension having a concentration of solids at least 5% by weight;

g. maintaining the solids in the wet state;

h. treating the wet solids as a suspension having a concentration of at least 5% by weight in water in the presence of an excess of sodium or lithium ions of from 25 to 250% over that providing the cation M in the general formula above by heating it to cause crystal growth of the hydrous magnesium silicate of the above formula for from 1 to 20 hours at a pressure at least equal to atmospheric pressure while maintaining the presence of water in the liquid state; and i. separating the resulting crystalline hydrous magnesium silicate.

4. A process as claimed in claim 1 wherein the precipitation of the water insoluble magnesium compound and of the silica is performed under conditions of stirring at a speed of below 200 revolutions per minute.

5. A process as claim in claim 1 wherein the concentrations of the reactants used in steps (a), (b) and (d) are controlled to give a suspension having a concentration of solids of at least 7% by weight and wherein the value of (b) in the general formula is up to 0.5.

6. A process as claimed in claim 5 wherein the suspension has a concentration of up to 10% of solids by weight.

7. A process as claimed in claim 1 wherein M is sodium.

8. A process as claimed in claim 1 wherein the suspension having a concentration of at least 5% produced by steps (a) to (f) is directly treated according to step (h).

9. A process as claimed in claim 1 wherein the suspension produced by steps (a) to (f) is boiled to expel $CO_2$.

10. A process as claimed in claim 9 wherein the concentrations of the reactants used in steps (a), (b) and (d) are controlled to give a suspension having a concentration of at least 7% by weight wherein the value of (b) in the general formula is up to 0.5, and wherein the suspension produced by steps (a) to (f) is directly treated according to step (h).

* * * * *